UNITED STATES PATENT OFFICE.

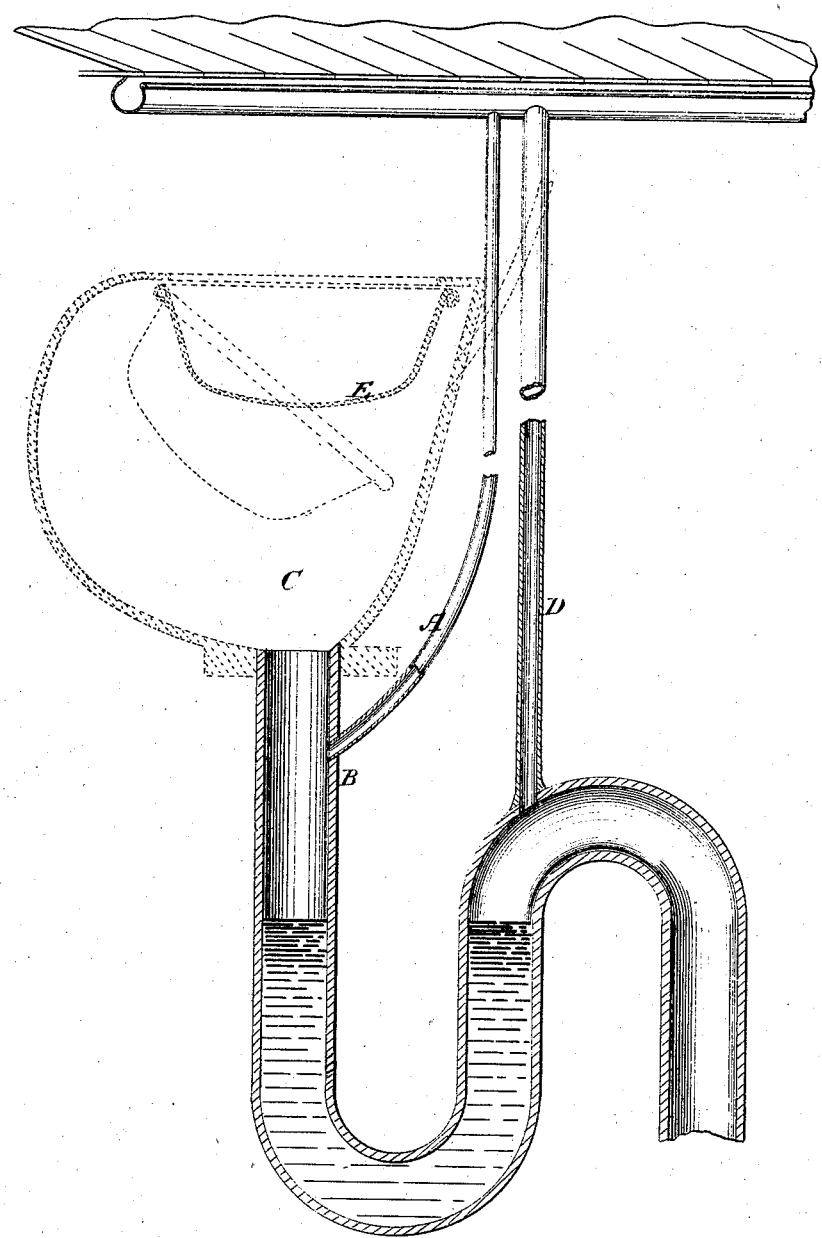

JOHN H. MORRELL, OF NEW YORK, N. Y.

IMPROVEMENT IN WATER SUPPLIES AND VENTS FOR TRAPS.

Specification forming part of Letters Patent No. 169,722, dated November 9, 1875; application filed October 1, 1875.

*To all whom it may concern:*

Be it known that I, JOHN H. MORRELL, of the city, county, and State of New York, have invented a new and Improved Water Supply and Vent for Traps; and I do hereby declare that the following is a full, clear, and exact description of the same, reference being had to the accompanying drawing forming a part of this specification.

The present invention relates to certain new and useful improvements in conducting water from the roof of a building to the water-closet, or other traps connected with the building, by leading a pipe from the roof, and connecting it at a point below the drop cup or pan of the water-closet, either to the bowl or pipe leading therefrom to the trap, the construction and operation of which will be understood from the following description:

The drawing represents a sectional elevation, showing my invention.

Similar letters of reference indicate corresponding parts.

In the case here presented, A represents a pipe leading from the roof of a building, and connected with the pipe B at a point between the bowl C and water-line of the trap. The said pipe may, if necessary, be connected with the pipe D, so as to receive its flow of water therefrom.

I do not limit myself to tapping the pipe B, as I also propose in some instances to tap the bowl, as shown in dotted lines at a point opposite the hinge of the water-cup E.

It will thus be seen that whether the pipe A is attached to the bowl or connected with the trap-pipe below the result will be the same— that is to say, it will form a means of supplying the trap with fresh water with each fall of rain, and also provide a means of direct ventilation from the water-closet above the trap, and in thus relieving the air-space between the water-line of the trap and the drop-cup E, it will effectually prevent the escape of such foul air or gases as might otherwise find their way into the house.

In my patent dated October 5, 1875, I show the pipe leading from the top of the trap to the roof, provided with a dividing-partition, which I also propose to use in connection with my present invention; but instead of this dividing-partition being set directly on the trap, I may locate it a little distance off in any convenient place.

I am aware that it is not new to provide the ordinary water-closet with a pipe leading into a chimney-flue for conducting off the foul air; hence I do not wish to be understood as making a claim to such invention; but, Having fully described my invention, what I do claim as new and of my invention herein is—

The pipe A, opening through the roof of a building, and serving the double purpose of conducting off the foul air from the closet, and conducting thereinto from the roof water for supplying the trap, in combination with the bowl C and pipe B, as and for the purpose specified.

JNO. H. MORRELL.

Witnesses:
SOLON C. KEMON,
CHAS. A. PETTIT.